Reissued May 14, 1929. Re. 17,295

UNITED STATES PATENT OFFICE.

JOHN CECIL WATSON, OF PAWTUCKET, RHODE ISLAND, ASSIGNOR, BY DIRECT AND MESNE ASSIGNMENTS, TO B. B. & R. KNIGHT CORPORATION, OF PROVIDENCE, RHODE ISLAND, A CORPORATION OF RHODE ISLAND.

CROSS-DYEING CELLULOSE FABRIC.

No Drawing. Original No. 1,629,769, dated May 24, 1927, Serial No. 123,802, filed July 20, 1926. Application for reissue filed July 25, 1928. Serial No. 295,341.

My invention relates to an improved process of manufacturing an all cellulose textile fabric in contrasting colors. I employ the words "cellulose textile fabric" to include an all cotton fabric, or a fabric made from the type of rayons which contain substantially the same percentage of cellulose as cotton or a greater percentage of cellulose and which have substantially the same affinity for the same types of dyestuffs as cotton namely, viscose rayon, cupra-ammonium rayon and chardonet rayon, etc., entirely or mixed with cotton. An application Serial No. 123,801 is filed of even date herewith July 20, 1926, which discloses broadly the same invention as this application. This application specifically covers a second species of the broad invention disclosed in Serial #123,801, application filed July 20, 1926. Another Patent No. 1,629,770, issued May 24, 1927 covers another species of the broad invention disclosed in said application.

Hitherto where it has been desired to produce a fabric having a two color effect, either the warp or the filling have been woven of two different materials such as cotton and silk which will taken the dye in different shades or amounts, or the warp or filling yarns have had to be separately dyed with two different colored dyes prior to weaving.

The main feature of my process is to treat the warp during the slashing process with the first step of a two step dyeing process, the nature of the ingredient thereof added to the size being such that it will have no appreciable effect upon its functioning, weaving the cloth in the usual manner with a filling and later treating the fabric with the second step of a two step dyeing process, which acts upon the prepared warp to form the dye thereon. I am aware that hiteherto it has ben suggested to add a direct or substantive dye to the size to simultaneously size and dye the fabric with a one step dyeing process. As the actual water soluble dye has to be inserted with the size it is obvious that in a short space of time, the size bath will become messy and the dyeing irregular and in addition a fast color is not produced.

Various types of two step dyeing processes are known and it is immaterial for the purposes of my invention what type of a two step dyeing process be employed so long as one is chosen wherein the first step has no appreciable effect upon the functioning of the size, nor the size on its functioning. The types of two step dyeing processes however, may be generally classed as three, namely (A). Where the first step thereof consists of treating the warp with a water soluble chemical having nondyeing properties, such as a mordant, soluble mineral salts, etc., as described in my corresponding application, Serial #123,801, and the second step treating it with a dye, (B) Where the first step consists of treating it with a dye or a dye component and the second step consist of treating it with an additional dye component and (C) Where the first step consists of treating the warp with a dyestuff in a true or modified form and the second step consists of treating it with a chemical having an oxidizing or a reducing action. The subject matter of species B is specifically claimed in this application, namely, where a dye or dye component is inserted with the size and a second dye component applied to the entire fabric to combine only with the treated warp.

I am aware that cotton goods of contrasting colors have been made by treating the warp or the filling threads entirely independently of the slashing process with a tannin mordant before weaving the cloth in the usual manner with an unprepared filling and then dyeing the fabric with a basic color which acts upon the mordanted warp alone and later dyeing the fabric with a direct color which acts on the unmordanted filling. This process is impractical and expensive for it requires the extra cost of an entirely distinct and separate step such as treating with a naphthol compound or other dye component employed independently of any sizing and prior to weaving. Thus the added cost of this added step makes this method of dyeing impractical. The warp is first beamed in a suitable fashion for use in a loom and then passed through a slasher box to cover it with a size so that the individual warp threads will stand up during the friction and wear they receive in the weaving process. The fabric is then woven in the usual manner. Thus in the usual gray cloth manufacturing plants at present there is no suitable dyeing or mordanting apparatus for performing this separate step. Employing my process however, which merely consists in putting a small amount of the ingredient of the first step of a two step dyeing process right into the slasher, a piece of standard equipment in every cotton mill, it is obvious that my process can be employed without the necessity of purchasing extra dyeing or mordanting equipment or without turning the cotton mill into a dye house. After weaving the fabric in the grey form it may then be sent to the dye house where the rest of my process may be completed to dye the fabric in contrasting colors with the usual dyeing equipment by any of the well-known processes.

These and such other objects of my invention as may hereinafter appear will be best understood from a description of various embodiments of my process.

My invention includes simultaneously treating the warp threads in the slashing process with a suitable size for weaving and with a first ingredient of a two step dyeing process, each of which has no appreciable effect on the functioning of the other, weaving the cloth in the usual manner with a filling and then treating the entire fabric with the second step of a two step dyeing process which acts upon the prepared warp to form the dye thereon. If desired the filling may be left white or it may also be dyed by again dyeing the fabric with a dye of a different nature and color, which acts on the filling to dye it a contrasting color to the warp. Whether the filling be left white or redyed it is obvious that it will always be of a contrasting color to the dyed warp.

A two step dyeing process may be selected wherein the first step thereof normally comprises treating the warp not with a water soluble chemical having non-dyeing properties, but with a real dye ingredient or a dyestuff in a true or modified form or an intermediate dye component, which would have no appreciable effect on the size, nor the size on its functioning. So far as I am aware no one has hitherto conceived of manufacturing an all cellulose textile fabric having component sets of warp and filling threads of contrasting colors by treating before weaving one of said component sets of threads with a dye ingredient of a two step dyeing process at any stage in the preparation of said set, then weaving said component set with the other component set to form the cloth and then forming the dyestuff on the prepared component set by treating the fabric with a second step of the two step dyeing process, which acts upon the prepared component set to form the dye thereon. The other component set may be either left white in a contrasting color to the dyed component set or dyed in a contrasting color by again separately dyeing the fabric with a dye of a different nature and color which acts on the unprepared set to dye it a contrasting color to the prepared component set. If desired each component set may be treated with a different dye ingredient of a two step dyeing process and the entire fabric subjected to a second common step of the two step dyeing process, which will simultaneously impregnate each component set with a different dye stuff. It is thus obvious that the other component set normally the one not sized may be either first dyed or prepared for simultaneously forming the dyestuff thereon with the other component set after weaving or left unprepared. My invention is peculiarly adapted to dye the warp threads with a relatively fast color and specifically includes simultaneously treating the warp threads with a size in the slashing process and simultaneously treating them with a dye ingredient of a two step dyeing process in the same solution. This eliminates the extra cost of an entirely distinct and separate step, namely, independently of any sizing and prior to weaving of suitably treating the proper threads with its added cost. At present in the composite process five steps are necessary.

(1) To size the warp.

(2) To treat the warp threads with a dye ingredient of a two step dyeing process.

(3) To treat the warp threads with the second step of a two step dyeing process.

(4) To treat the filling threads with a dye ingredient of a two step dyeing process.

(5 To treat the filling threads with the second step of a two step dyeing process.

Employing my invention however, where especially types of naphthol compounds, or indigosols or other stabilized soluble ester-like derivatives of vat dyestuffs later to be described are employed it is obvious that these five steps may be cut down to three, namely step one of sizing the warp threads and step two of treating the warp threads with a dye ingredient of a two step dyeing process may be done simultaneously. Step four of treating the filling threads with a dye ingredient of a two step dyeing process will have to be done separately as usual. The sized and prepared warp threads and the prepared filling threads may be then woven and step three namely, treating the warp threads with the second step of their respective two step dyeing process and in addition step five of treating the filling threads with their separate step of their respective two step dyeing process may be done simultaneously by treating the warp and the filling threads in the fabric with the same step.

This class of a two step dyeing process, namely where the first step in the two step dyeing process comprises treating the material to be dyed with a dye or dye ingredient divides itself into two general classes namely—

(B) Where the second step comprises treating the fabric with an additional dye or a dye component and, (C) Where the second step in the dyeing comprises treating the material desired to be dyed with a chemical having an oxidizing or a reducing action to form the dyestuff on the fabric.

I will now describe in detail various embodiments of these different classes. This entire generic class is claimed in this application, which specifically claims dyestuffs of the generic sub-class B heretofore referred to. Dyeing with a type of dyestuff hereinafter referred to in sub-class C is specifically claimed in Patent No. 1,629,770, issued May 24, 1927 to John C. Watson, filing date July 20, 1926, filed of even date herewith.

Although as stated, the preparation of either or both of these sets of component threads by treating them with a dye ingredient of a two-step dyeing process may be done at any point in the preparation prior to weaving, I preferably so treat the warp threads while slashing and I will specifically describe this treatment in this description of the application of the following dyes. As stated however, it is immaterial whether the filling be first dyed, separately prepared by treating it with a dye ingredient of a two step dyeing process or left unprepared. I will now describe specifically the application of the dyeing process of the type of dyestuffs normally included in classes B and C namely, where the warp is simultaneously slashed and treated with a dye ingredient of a two step dyeing process, whether that dye ingredient comprises a dyestuff or an intermediate dye component, and whether after weaving, the entire fabric is after treated with a dye or with an intermediate dye component which couples with said first dye or intermediate dye component to form a dyestuff impregnated on the prepared warp as in class B, or whether the dyestuff be impregnated on the warp by treating the fabric with a water soluble chemical having an oxidizing or a reducing action as in class C. Perhaps the most important class of dyestuffs in this general class B are the developed colors. Applying my process to developed colors I simultaneously treat the warp in the slashing process with a size and with an intermediate dye component such as a naphthol compound, each of which has no appreciable effect on the functioning of the other, weave the cloth in the usual manner with a filling and later on aftertreat the fabric with a second intermediate dye component such as a developed dye base to couple said components to form a dyestuff impregnated on the prepared warp. My invention therefore makes it possible to dye the warp or filling, also if desired in faster shades than hitherto thought possible in cellulose dyeing of this description. The slasher solution may be prepared as follows: 25 pounds of sago or other suitable size are added to 50 gallons of water. To this bath is added if desired 2 gallons of alizarine soluble oil. To this bath is also added as an intermediate dye component 6 pounds of naphthol A. S. (anilide of beta oxynaphtholic acid, no Schultz or color index number) and 4 pounds of dry caustic soda. These materials may then be boiled together for about twenty minutes in the size tank, after which 5 pounds of sodium thiosulphate crystals are added.

After the contents of the size tank have been mixed well, they are then run into the slasher box and the warp sized as usual. It is thus obvious that the goods may be prepared for dyeing the warp with a developed color merely by adding a small proportion of an intermediate dye component to the sizing mixture. In place of sago, potato, corn or any suitable sizing material may be employed, and in place of naphthol, caustic soda and sodium thiosulphate, any other suitable dye component with its other necessary ingredients may be employed. The goods are then woven as hitherto explained and are then sent from the weave shop to the dye house.

After weaving, the fabric is suitably developed with a diazo base which acts upon the prepared warp. Although this may be done in any suitable manner, it is preferably done in a jig. For this purpose 7 pounds of fast red T. R. base (5 chloro, 2-amino toluene hydrochloride, no Schultz or color index number) may be dissolved in 8 gallons boiling water, to which 2 gallons of hydrochloric acid may be added. After standing one-half hour in the mixing tub, a block of ice is inserted therein. After the mixture is cooled to about 40° F. 4½ pounds of sodium nitrate or other suitable chemical is added. After standing one-half hour, 4½ pounds of powdered alum are preferably added. Just prior to use, 7 pounds of powdered chalk are preferably added, when the entire solution may be poured into the jig. The fabric is then passed through the jig for several minutes, sufficient to thoroughly diazotize and develop the color on the warp. The strength and materials and time of dyeing, of course, depend to some extent upon the shade desired. It is obvious that in place of the fast red T. R. base and other chemicals described, other suitable intermediate dye components or chemicals may be employed depending upon the color or shading desired to be produced. This dye bath is then run off, the goods, washed, preferably in the jig, or if desired, dried, singed and mercerized. If not mercerized, after the last wash, the goods may be re-dyed in the same jig preferably with a 3 or 4% solution of a substantive or direct color of a different shade. After this, they may be washed, dried and finished in the usual manner. If it is desired to have the filling threads white in contrast to the dyed warp threads, the last step of dyeing the fabric with a direct color may be dispensed with.

Any suitable type of a naphthol compound may be employed. There have recently come on the market various different types of new naphthol compounds, which are derivatives of naphthol such as the A. S. group, which is probably the best known which are aryl armides or other derivatives of beta oxynaphthoic-acid or compounds which function in similar fashion. Any of these naphthols may be coupled with a second intermediate dye component to form a dyestuff impregnated on the prepared warp. In fact different naphthols of this group may be coupled with the same base or second intermediate dye component to form different colored dyestuffs. Thus, if desired very pretty fast color effects may be produced, such as by treating the warp in the slashing process with a naphthol A. S. S. W. (beta-naphthalide of beta oxynaphthoic acid, no Schultz or color index number) and then treating the filling prior to weaving with a naphthol A. S. G. (diaceto-acetic-tolidide, no Schultz or color index number), then weaving the cloth in the usual manner and later after treating the fabric with a fast black L. B. base (O-phenetidene azo alpha naphthyl amine, no Schultz or color index number), a black dye will be developed on the prepared warp and a brownish red dye will be developed on the prepared filling, both dyes of the normal fastness of a developed dye. It is thus obvious that in employing my invention in this manner faster shades may be developed on the filling, than is possible by merely dyeing the filling by after dyeing the entire fabric with a direct or substantive color. It is obvious that in place of naphthol any suitable intermediate dye component may be employed and in place of fast red T. R. base or a fast black L. B. base any suitable type of a second intermediate dye component may be employed. If desired the stabilized diazo compounds which have recently come upon the market may be employed as the second intermediate dye component which dissolve in water directly to form the coupling solution without the necessity of any other chemicals or treatment. In place of naphthols or their derivatives any other suitable type of intermediate dye components such as N. W. (1-4 alpha naphthol sulphonic acid) etc. may be employed to be coupled with a diazo component as the second step. If desired an intermediate dye component of the type of primuline (color index number 812, Schultz Number 616) may be employed as the first intermediate dye component which when diazotized and treated with a naphthol as a second dye component will develop a fast red color on the treated component set, in a sense a reversal to the method specifically described.

I will now specifically describe the application of class C of the two step dyeing process where the first ingredient of the two step dyeing process comprises treating the fabric with a dyestuff modified or unmodified and the second step thereof comprises aftertreating the fabric with a chemical having an oxidizing or a reducing action. The most important types of dyestuffs of this class include vat dyestuffs or their derivatives which as is well-known are among the fastest colors. Any suitable type of vat dyestuffs may be employed. If the vat dyestuff be insoluble it may be adhered to the prepared warp with the size and when the fabric is suitably aftertreated after weaving the insoluble vat dyestuff will change into a leuco compound to dye the warp on withdrawal from the bath.

Perhaps the most important class of modified dyes which may be dyed in this manner are the stabilized water soluble leuco compounds of vat dyestuffs which have recently come on the market commonly known as indigosols. Any suitable type of this general type of dyestuff may be employed. What I preferably employ are the types of dyestuffs described in U. S. Patents Nos. 1,448,251 and 1,575,958—which are the water soluble ester-like derivatives of the leuco compounds of any suitable type of vat dyestuffs whether they be produced from indigo as are the types now being put on the market by Societé Durand & Huguenin S. A. or those derived from indanthrenes which according to an article in "The Journal of Dyers and Colorists" for Feb. 1925 are now being put on the market by the Scottish Dyes Ltd. This class of ester-like derivatives whether they be produced from indigo or from indanthrenes or from any other vat dyestuffs are aftertreated to develop the dyestuff on the fabric by reforming the dye by the action of a suitable oxidizing agent. For the purposes of my invention however, any suitable type of a stabilized water soluble derivative of a vat dyestuff may be employed like the dehydro-indigos as described in German Patent Nos. 17,477—220,173—237,262—239,314 which are later developed on the fabric by reforming the dye by the action of a suitable reducing agent.

I will specifically describe the application of an indigosol such as indigosol O4B. (the soluble ester derivative of ciba blue 2B or tetrabrom—indigo, color index number 1184) for blue sold in America by the General Dye-Stuffs Corporation, Carbic Color and Chemical Company, Inc., etc. specifically applying it to the warp in the slashing process.

The slasher tank solution may be prepared as follows:

25 pounds of sago or other suitable size are added to 50 gallons of water. To this bath is added if desired 2 gallons of alizarine soluble oil. To the bath is also added as the dye ingredient of the two step dyeing process 1–3 pounds of indigosol blue O4B the amount depending upon the shade desired, preferably previously dissolved in about 3 gallons of water. These materials may then the boiled together for about 20 minutes in the size tank after which an amount of sodium nitrite equal in weight to the indigosol used is added. After the contents have been mixed well they are then run into the slasher box and the warp sized as usual. It is thus obvious that the goods may be prepared for dyeing the warp with a vat color by adding a small proportion of a vat dyestuff, modified, or unmodified to the sizing mixture. In place of sago, potato, corn, or any other suitable starch, flour or any other suitable sizing materials may be employed and in place of indigosol O4B any type of vat dyestuff modified or unmodified preferably a stabilized water soluble ester-like derivative of the leuco compound may be employed. In place of sodium nitrite any other suitable oxidizing agent may be employed, or if desired this may be dispensed with. The goods are then woven as hitherto explained and then sent from the weave shop to the dye house.

After weaving the dyestuff is developed on the warp by suitably forming the dye thereon by any suitable aftertreatment depending on the nature of the vat dyestuff employed. Where an indigosol or any water soluble ester-like derivative of a vat dye stuff has been employed as the first dye ingredient, I preferably reform the dyestuff on the warp by an action of a suitable oxidizing agent. Although this may be done in any suitable manner, it is preferably done by passing the woven fabric through a jig. To reform the dyestuff by oxidation and to free the oxygen from the sodium nitrite preferably added to the first dye ingredient with the size, I preferably fill the jig with a 2° Tw. sulphuric acid, when dyeing with an indigosol or like ester-like derivative the color will immediately be developed on the warp. If other types of vat dyestuffs or their stabilized water soluble derivatives be employed they may be suitably reduced to the desired leuco compound in any well-known manner, after which the dyestuff will be reformed on the fabric by oxidation on exposure to the air. Any suitable type of acid may be employed and any other suitable type of an oxidizing agent other than nitrite of soda may be employed. The goods are then washed, soaked and washed, preferably in a jig or if desired dried and mercerized. If not mercerized after the last wash the goods may be re-dyed in the same jig, preferably with a three or four percent solution of a substantive or direct color of a different shade. After this they may be washed, dried and finished in the usual manner. If it is desired to have the filling threads un-dyed and left a white in a contrasting color to the dyed warp the last step of dyeing the fabric with a direct color may be dispensed with. If it is desired to dye the filling threads a faster color than they may be dyed with a direct color in a contrasting shade, it is obvious that the filling threads may also prior to weaving be similarly treated with a different type of indigosol such as indigosol violet A. Z. B. (the soluble ester derivative of alizarine indigosol violet B, an indigoid vat color, having no Schultz or color index number and an unpublished chemical formula). The fabric is woven in the usual manner and later on passing the fabric through acid a blue dyestuff will be developed on the warp and a helio dyestuff will be dyed on the filling, thus as explained eliminating two of the five steps hitherto necessary in dyeing of this description.

It is obvious that by simultaneously treating the warp in the slasher box with a size and with a first step of a two step dyeing process, each of which has no appreciable effect on the function of the other weaving the cloth in the usual manner with the filling and treating the fabric with the second step of a two step dyeing process, which acts on the prepared warp to form the dye thereon, that it reduces the cost of manufacturing an all cellulose textile fabric in contrasting colors by the cost of one entire step in the process, as hitherto explained, namely by the separate step of treating the warp separately with the first step of the two step dyeing process. It is apparent that I have provided a process which may be readily put in the cotton mills without extra equipment and that I have shown for the first time a method of dyeing cellulose fabrics in contrasting colors faster than any hitherto used for this purpose.

As explained, my invention broadly includes the step in the process of manufacturing an all cellulose textile fabric having component sets of warp and filling threads of contrasting colors, which comprises, treating before weaving one of said component sets of threads with a dye ingredient of a two step dyeing process at any stage in the process of manufacture thereof or both sets with a different dye ingredient of a two step dyeing process. Where this is done other than in the size bath however, it is obvious that the cotton mills will have to be provided with additional tanks or other equipment. Where it is desired to thus treat the warp or the filling threads other than in the slashing process they may be treated in exactly the same fashion as hitherto explained with the same strength solutions omitting the addition of the size to the first step.

It is obvious that in place of treating the entire warp or filling with the first step of a two step dyeing process only parts of them may be so treated and I therefore employ the phrases in the claims "component sets of warp and filling threads" to include the entire warp or filling threads or any desired part thereof. I employ the words "cellulose textile fabric" to include an all cotton fabric or a fabric made from the type of rayons which contain substantially the same percentage of cellulose as cotton or a greater percentage of cellulose and which have substantially the same affinity for the same type of dyestuffs as cotton namely, viscose rayon, cupra-ammonium rayon and chardonet rayon, etc. entirely or mixed with cotton.

In the claims I employ the phrases "dye component" or "intermediate dye component" to include any intermediate when not in the form of the dyestuff formed on the fibre as the final result of my process, but which has to be coupled with another "dye component" to form the dye stuff formed on the fibre as the final result of my process and which may or may not of itself have intrinsic dyeing properties. In the claims I employ the phrase "dye ingredient" to include a dye stuff in true or modified form or an intermediate dye component, which of itself has some intrinsic dyeing properties, but which must be later after-treated to change it into the dye stuff actually formed on the fibre as the final result of my process. In the claims I employ the phrase "developed dye preparatory ingredient" to include any substance, which will prepare a fibre of the type claimed herein, so that it may later "take" a developed dye by any of the well known developed dye dyeing processes.

I employ the word "weave" in the claims in its broad sense as defined in Webster's Dictionary of 1866 which defines it as follows: 1. "To unite, as threads of any kind, in such a manner as to form a texture; to entwine or interlace into a fabric as to weave wool, silk and the like; hence, to unite by close connection or mixture, to unite intimately .... 2. To form, as cloth, by interlacing threads; to compose, as a texture of any kind, by putting together textile materials; hence, to form into a fabric; to compose."

It is understood that my invention is not limited to the specific processes and products described and the various deviations may be made therefrom without departing from the spirit and scope of the appended claims.

What I claim as new and desire to secure by Letters Patent is:

1. The herein described improved process of manufacturing an all cellulose textile fabric having component sets of warp and filling threads of contrasting colors which comprises treating before weaving one of said component sets with a dye ingredient of a two step dyeing process, treating the other component set with a different dye ingredient of a similar two step dyeing process, then weaving said component sets to form the fabric and treating the fabric with a second common ingredient of the two step dyeing process which acts on one component set to impregnate it with a dye stuff of one color and acts on the other component set to impregnate it with a dye stuff of a different contrasting color.

2. The herein described improved process of manufacturing an all cellulose textile fabric in contrasting colors, which comprises simultaneously treating the warp in the slashing process with a size and with a dye ingredient of a two step dyeing process, each of which has no appreciable effect on the functioning of the other, treating the filling with a different dye ingredient of a similar two step dyeing process, then weaving said warp and filling in the usual manner to form the fabric and treating the fabric with the common ingredient of the two step dyeing process which acts on the warp to impregnate it with a dye stuff of one color and which acts on the filling to impregnate it with a dye stuff of a contrasting color.

3. The herein described improved process of manufacturing an all cellulose textile fabric having component sets of warp and filling threads of contrasting colors which comprises treating before weaving one of said component sets of threads with an intermediate dye component, then weaving said component set with the other component set to form the fabric, treating the fabric with a second intermediate dye component to couple said components to form a dye stuff impregnated on the prepared set, and again dyeing the fabric with a dye of a different nature and color, which acts on the unprepared component set to dye it in a contrasting color to the prepared component set.

4. The herein described improved process of manufacturing an all cellulose textile fabric having component sets of warp and filling threads of contrasting colors which comprises treating before weaving one of said component sets of threads with an intermediate dye component, then weaving said component set with the other component set to form the fabric and, treating the fabric with a second intermediate dye component to couple said components to form a dye stuff impregnated on the prepared set.

5. The herein described improved process of manufacturing an all cellulose textile fabric having component sets of warp and filling threads of contrasting colors which comprises treating before weaving one of said component sets with an intermediate dye component, treating the other component set with a different intermediate dye component, then weaving said component set with the other component set to form the fabric and treating the fabric with a common intermediate dye component to couple it with the dye component on one component set to impregnate it with a dye stuff of one color and to couple it with the dye component on the other component set to impregnate it with a dye stuff of a different contrasting color.

6. The herein described improved process of manufacturing an all cellulose textile fabric in contrasting colors, which comprises simultaneously treating the warp in the slashing process with a size and with an intermediate dye component, each of which has no appreciable effect on the functioning of the other, weaving the fabric in the usual manner with a filling, treating the fabric with a second intermediate dye component to couple said components to form a dye stuff impregnated on the prepared set, and again dyeing the fabric with a dye of a different nature and color, which acts on the unprepared component set to dye it in a contrasting color to the prepared component set.

7. The herein described improved process of manufacturing an all cellulose textile fabric in contrasting colors, which comprises simultaneously treating the warp in the slashing process with a size and with an intermediate dye component, each of which has no appreciable effect on the functioning of the other, weaving the fabric in the usual manner with a filling and treating the fabric with a second intermediate dye component to couple said components to form a dye stuff impregnated on the prepared warp.

8. The herein described improved process of manufacturing an all cellulose textile fabric in contrasting colors, which comprises simultaneously treating the warp in the slashing process with a size and with an intermediate dye component, each of which has no appreciable effect on the functioning of the other, treating the filling with a different intermediate dye component, then weaving said warp and filling in the usual manner to form the fabric and treating the fabric with a common intermediate dye component to couple it with the dye component on one component set to impregnate it with a dye stuff of one color and to couple it with the dye component on the other component set to impregnate it with a dye stuff of a different contrasting color.

9. The herein described improved process of manufacturing an all cellulose textile fabric having component sets of warp and filling threads of contrasting colors which comprises treating before weaving one of said component sets with a developed dye preparatory ingredient, treating the other component set with a different developed dye preparatory ingredient, then weaving said component sets to form the fabric and treating the fabric with a developed dye base, which acts on one component set to impregnate it with a dye stuff of one color and acts on the other component set to impregnate it with a dye stuff of a different contrasting color.

10. The herein described improved process of manufacturing an all cellulose textile fabric in contrasting colors, which comprises simultaneously treating the warp in the slashing process with a size and with a developed dye preparatory ingredient, each of which has no appreciable effect on the functioning of the other, treating the filling with a different developed dye preparatory ingredient, then weaving said warp and filling in the usual manner to form the fabric and treating the fabric with a developed dye base, which acts on the warp to impregnate it with a dye stuff of one color and which acts on the filling to impregnate it with a dye stuff of a contrasting color.

11. The herein described improved process of manufacturing an all cellulose textile fabric having component sets of warp and filling threads of contrasting colors which comprises treating before weaving one of said component sets with a solution of a naphthol, weaving said component set with the other component set to form the fabric, treating the fabric with a diazotized base, which acts on the prepared component set to impregnate it with a dye stuff and again dyeing the fabric with a direct dye of a different shade, which acts on the unprepared component set to dye it a contrasting color to the prepared component set.

12. The herein described improved process of manufacturing an all cellulose textile fabric having component sets of warp and filling threads of contrasting colors, which comprises treating before weaving one of said component sets of threads with a solution of a naphthol, then weaving said component set with the other component set to form the fabric, and treating the fabric with a diazotized base, which acts on the prepared component set to impregnate it with a dye stuff.

13. The herein described improved process of manufacturing an all cellulose textile fabric having component sets of warp and filling threads of contrasting colors which comprises treating before weaving one of said component sets with a solution of a naphthol, treating the other component set with a solution of a different naphthol, then weaving said component sets to form the fabric and treating the fabric with a diazotized base, which acts on one component set to impregnate it with a dye stuff of one color and acts on the other component set to impregnate it with a dye stuff of a different contrasting color.

14. The herein described improved process of manufacturing an all cellulose textile fabric in contrasting colors, which comprises simultaneously treating the warp in the slashing process with a size and with a solution of a naphthol, each of which has no appreciable effect on the functioning of the other, weaving the fabric in the usual manner with a filling, treating the fabric with a diazotized base, which acts on the warp to impregnate it with a dye stuff and again dyeing the fabric with a dye of a different nature and color which acts upon the unprepared filling to dye it a contrasting color to the warp.

15. The herein described improved process of manufacturing an all cellulose textile fabric in contrasting colors, which comprise simultaneously treating the warp in the slashing process with a size and with a solution of naphthol, each of which has no appreciable effect on the functioning of the other, weaving the fabric in the usual manner with a filling and treating the fabric with a diazotized base, which acts on the warp to impregnate it with a dye stuff.

16. The herein described improved process of manufacturing an all cellulose textile fabric in contrasting colors, which comprises simultaneously treating the warp with a size and with a solution of a naphthol, each of which has no appreciable effect on the functioning of the other, treating the filling with a solution of a different naphthol, then weaving said warp and filling in the usual manner to form the fabric and treating the fabric with a diazotized base, which acts on the warp to impregnate it with a dye stuff of one color and which acts on the filling to impregnate it with a dye stuff of a contrasting color.

17. The herein described improved step in the process of manufacturing an all cellulose textile fabric in contrasting colors, which comprises simultaneously treating the warp in the slashing process with a size and with a solution of a naphthol, each of which has no appreciable effect upon the functioning of the other.

18. An all cellulose textile fabric in the gray state made up of component sets of threads interwoven with other component sets of threads, one of said component sets of threads being impregnated with a dye ingredient of a two step dyeing process and another of said component sets of threads being impregnated with a different dye ingredient of a similar two step dyeing process.

19. An all cellulose textile fabric in the gray state made up of component sets of threads interwoven with other component sets of threads, one of said component sets of threads being impregnated with an intermediate dye component and another of said component sets being impregnated with a different intermediate dye component.

20. An all cellulose textile fabric in the gray state made up of component sets of threads interwoven with other component sets of threads, one of said component sets of threads being impregnated with an intermediate dye component.

21. An all cellulose textile fabric in the gray state made up of component sets of threads interwoven with other component sets of threads, one of said component sets of threads being impregnated with a naphthol and another of said component sets being impregnated with a different naphthol.

22. An all cellulose textile fabric in the gray state made up of component sets of threads interwoven with other component sets of threads, one of said component sets of threads being impregnated with a naphthol.

23. The herein described improved process of manufacturing an all cellulose textile fabric having component sets of warp and filling threads of contrasting colors which comprises treating before weaving one of said component sets with a stable dye ingredient of a two step dyeing process, treating the other component set with a different stable dye ingredient of a similar two step dyeing process, then weaving said component sets to form the fabric and treating the fabric with a second common ingredient of the two step dyeing process which acts on one component set to impregnate it with a dye stuff of one color and acts on the other component set to impregnate it with a dye stuff of a different contrasting color.

24. The herein described improved process of manufacturing an all cellulose textile fabric having component sets of warp and filling threads of contrasting colors which comprises treating before weaving one of said component sets of threads with a stable intermediate dye component, then weaving said component set with the other component set to form the fabric and, treating the fabric with a second intermediate dye component to couple said components to form a dye stuff impregnated on the prepared set.

25. The herein described improved process of manufacturing an all cellulose textile fabric having component sets of warp and filling threads of contrasting colors which comprises treating before weaving one of said component sets with a stable intermediate dye component, treating the other component set with a different stable intermediate dye component, then weaving said component set with the other component set to form the fabric and treating the fabric with a common intermediate dye component to couple it with the dye component on one component set to impregnate it with a dye stuff of one color and to couple it with the dye component on the other component set to impregnate it with a dye stuff of a different contrasting color.

26. The herein described improved process of manufacturing an all cellulose textile fabric having component sets of warp and filling threads of contrasting colors, which comprises treating before weaving one of said component sets of threads with a solution of a stable naphthol, then weaving said component set with the other component set to form the fabric, and treating the fabric with a diazotized base, which acts on the prepared component set to impregnate it with a dye stuff.

27. The herein described improved process of manufacturing an all cellulose textile fabric having component sets of warp and filling threads of contrasting colors which comprises treating before weaving one of said component sets with a solution of a stable naphthol, treating the other component set with a solution of a different stable naphthol, then weaving said component sets to form the fabric and treating the fabric with a diazotized base, which acts on one component set to impregnate it with a dye stuff of one color and acts on the other component set to impregnate it with a dye stuff of a different contrasting color.

28. The herein described improved process of manufacturing an all cellulose textile fabric in contrasting colors, which comprise simultaneously treating the warp in the slashing process with a size and with a solution of a stable naphthol, each of which has no appreciable effect on the functioning of the other, weaving the fabric in the usual manner with a filling and treating the fabric with a diazotized base, which acts on the warp to impregnate it with a dye stuff.

29. The herein described improved process of manufacturing an all cellulose textile fabric in contrasting colors, which comprises simultaneously treating the warp with a size and with a solution of a stable naphthol, each of which has no appreciable effect on the functioning of the other, treating the filling with a solution of a different stable naphthol, then weaving said warp and filling in the usual manner to form the fabric and treating the fabric with a diazotized base, which acts on the warp to impregnate it with a dye stuff of one color and which acts on the filling to impregnate it with a dye stuff of a contrasting color.

30. The herein described improved step in the process of manufacturing an all cellulose textile fabric in contrasting colors, which comprises simultaneously treating the warp in the slashing process with a size and with a solution of a stable naphthol, each of which has no appreciable effect upon the functioning of the other.

31. An all cellulose textile fabric in the gray state made up of component sets of threads interwoven with other component sets of threads, one of said component sets of threads being impregnated with a stable dye ingredient of a two step dyeing process and another of said component sets of threads being impregnated with a different stable dye ingredient of a similar two step dyeing process.

32. An all cellulose textile fabric in the gray state made up of component sets of threads interwoven with other component sets of threads, one of said component sets of threads being impregnated with a stable intermediate dye component and another of said component sets being impregnated with a different stable intermediate dye component.

33. An all cellulose textile fabric in the gray state made up of component sets of threads interwoven with other component sets of threads, one of said component sets of threads being impregnated with a stable intermediate dye component.

34. An all cellulose textile fabric in the gray state made up of component sets of threads interwoven with other component sets of threads, one of said component sets of threads being impregnated with a stable naphthol and another of said component sets being impregnated with a different stable naphthol.

35. An all cellulose textile fabric in the gray state made up of component sets of threads interwoven with other component sets of threads, one of said component sets of threads being impregnated with a stable naphthol.

36. The herein described improved process of manufacturing an all cellulose textile fabric having component sets of warp and filling threads of contrasting colors, which comprises treating before weaving one of said component sets of threads with a solution of a naphthol of the A. S. group, then weaving said component set with the other component set to form the fabric, and treating the fabric with a diazotized base, which acts on the prepared component set to impregnate it with a dye stuff.

37. The herein described improved process of manufacturing an all cellulose textile fabric having component sets of warp and filling threads of contrasting colors which comprises treating before weaving one of said component sets with a solution of a naphthol of the A. S. group, treating the other component set with a solution of a different naphthol of the A. S. group, then weaving said component sets to form the fabric and treating the fabric with a diazotized base, which acts on one component set to impregnate it with a dye stuff of one color and acts on the other component set to impregnate it with a dye stuff of a different contrasting color.

38. The herein described improved process of manufacturing an all cellulose textile fabric in contrasting colors, which comprise simultaneously treating the warp in the slashing process with a size and with a solution of a naphthol of the A. S. group, each of which has no appreciable effect on the functioning of the other, weaving the fabric in the usual manner with a filling and treating the fabric with a diazotized base, which acts on the warp to impregnate it with a dye stuff.

39. The herein described improved process of manufacturing an all cellulose textile fabric in contrasting colors, which comprises simultaneously treating the warp with a size and with a solution of a naphthol of the A. S. group, each of which has no appreciable effect on the functioning of the other, treating the filling with a solution of a different naphthol of the A. S. group, then weaving said warp and filling in the usual manner to form the fabric and treating the fabric with a diazotized base, which acts on the warp to impregnate it with a dye stuff of one color and which acts on the filling to impregnate it with a dye stuff of a contrasting color.

40. The herein described improved step in the process of manufacturing an all cellulose textile fabric in contrasting colors, which comprises simultaneously treating the warp in the slashing process with a size and with a solution of a naphthol of the A. S. group, each of which has no appreciable effect upon the functioning of the other.

41. An all cellulose textile fabric in the gray state made up of component sets of threads interwoven with other component sets of threads, one of said component sets of threads being impregnated with a naphthol of the A. S. group and another of said component sets being impregnated with a different naphthol of the A. S. group.

42. An all cellulose textile fabric in the gray state made up of component sets of threads interwoven with other component sets of threads, one of said component sets of threads being impregnated with a naphthol of the A. S. group.

In testimony whereof I affix my signature.

JOHN CECIL WATSON.